United States Patent
Schweitzer et al.

[11] Patent Number: 5,975,117
[45] Date of Patent: Nov. 2, 1999

[54] PIPE FITTING FOR DRILLING

[75] Inventors: Ruediger Schweitzer, Weinheim; Wolfgang Sichler; Steffen Kretz, both of Mannheim, all of Germany

[73] Assignee: Friatec Aktiengesellschaft, Mannheim, Germany

[21] Appl. No.: 08/979,941

[22] Filed: Nov. 26, 1997

[30] Foreign Application Priority Data

Nov. 30, 1996 [DE] Germany ............................ 196 49 731
Oct. 24, 1997 [EP] European Pat. Off. .............. 97118520

[51] Int. Cl.[6] ............................. F16K 43/00; F16L 41/06
[52] U.S. Cl. .............................. 137/318; 30/93; 285/197; 408/87
[58] Field of Search ........................... 137/318; 285/197; 408/87, 102, 137, 138; 30/92, 95, 96; 222/83, 91

[56] References Cited

U.S. PATENT DOCUMENTS

| | | | |
|---|---|---|---|
| 2,839,075 | 6/1958 | Mueller | 137/318 |
| 3,617,145 | 11/1971 | Celmer et al. | 137/318 |
| 3,747,894 | 7/1973 | Pepper | 251/215 |
| 3,756,261 | 9/1973 | Minchoff | 137/318 |
| 3,905,718 | 9/1975 | Luckenbill et al. | 137/318 |
| 4,063,844 | 12/1977 | Pessia | 137/318 |
| 4,067,353 | 1/1978 | DeHoff | 137/318 |
| 4,076,038 | 2/1978 | Wynne | 137/318 |
| 4,258,742 | 3/1981 | Louthan et al. | 137/318 |
| 4,428,920 | 1/1984 | Willenberg et al. | 423/465 |
| 4,515,177 | 5/1985 | Thalmann et al. | 137/318 |
| 4,655,480 | 4/1987 | Thalmann | 137/318 |
| 4,682,624 | 7/1987 | Turner | 137/318 |
| 4,998,562 | 3/1991 | Foltz | 251/215 |
| 5,076,318 | 12/1991 | Fedora | 137/318 |
| 5,345,964 | 9/1994 | Friedel | 137/318 |
| 5,348,045 | 9/1994 | Serve | 137/318 |
| 5,732,732 | 3/1998 | Gross et al. | 137/318 |

FOREIGN PATENT DOCUMENTS

| | | |
|---|---|---|
| 63750 | 4/1982 | European Pat. Off. |
| 597652 | 11/1993 | European Pat. Off. |
| 747164 | 12/1996 | European Pat. Off. |
| 2935565 | 3/1981 | Germany. |
| 38 30 395 | 1/1990 | Germany. |
| 40 39 353 | 3/1992 | Germany. |

OTHER PUBLICATIONS

Abstract of Japanese Patent Publication No. JP 60–204616.
Abstract of Japanese Patent Publication No. JP 08–071788.
Abstract of Japanese Patent Publication No. JP 84–241038.
Abstract of Japanese Patent Publication No. JP 85–258609.

*Primary Examiner*—George L. Walton
*Attorney, Agent, or Firm*—Evenson, McKeown, Edwards & Lenahan, P.L.L.C.

[57] ABSTRACT

A pipe tapping valve which can be connected, for example by welding, with a pipe which is to be tapped, and which includes a support stub (4) in which a drill bit (26) is disposed for axial movement, and with which a branch nipple (12) is connected. The pipe tapping valve is configured so that the drilling of the tube can be safely performed with little difficulty, while a seal satisfying the requirements of the particular application is provided both during the drilling and after the drilling has ended. The support stub (4) has a substantially smooth cylindrical inside surface; the drill bit (26) contains at its upper free end an expansion (30) or a sealing ring (54) in contact with the inner surface (34) of the support stub (4), and the drill bit (26) is axially movable by means of a drilling tool (36) attachable to the support stub (4).

17 Claims, 3 Drawing Sheets

PIPE FITTING FOR DRILLING

BACKGROUND OF THE INVENTION

The invention relates to a pipe tapping valve which can be attached to a pipe, especially by welding, and which comprises a support stub in which a drill bit is disposed for axial movement and to which a nipple is attached.

A pipe tapping valve of this kind is disclosed in Freidel, German Patent No. DE 3,830,395 C1 and can be attached to a plastic pipe, especially by welding. The pipe tapping valve comprises a branch in which a drill bit designed for drilling the pipe is disposed for axial movement. A sleeve with an internal thread is sealingly integrated into the branch in a non-rotatable manner. The drill has an external thread engaging the internal thread, as well as an internal hexagon for a tool. When the inserted tool is rotated, the drill performs an axial feed for drilling through the wall of the pipe connected to the valve. Also, at least one sealing ring is provided in order to prevent the escape of the medium flowing through the pipe after it has been drilled. This pipe tapping valve has proven to be very useful in many cases, but requires a substantial expenditure of material and effort to manufacture it.

Lang, German Patent No. DE 4,039,353 C1 discloses a system for shutting off a pipe, on the outside surface of which an upper part can be fastened, especially a metal clamp. The upper part contains a support stub to which the housing of a pipe tapping valve can be joined. The pipe tapping fitting contains a threaded spindle whose external thread engages an internal thread in the housing. A drill bit can be attached to the threaded spindle, which is also configured as a stopper. When the threaded spindle is rotated the drill is advanced axially in order to drill into the plastic pipe. The drill contains an external thread which provides for the anchoring of the drill bit or stopper in the pipe after drilling. After the drilling is done the anti-rotational connection of the drill bit is released from the threaded spindle and the housing is removed from the upper part, the drill bit remaining in the pipe as a stopper.

Furthermore, a pipe tapping valve made of plastic is disclosed in Pessia, U.S. Pat. No. 4,063,844, in which a support stub contains an internal thread for the drill bit. The drill bit furthermore has an internal hexagon for a hexagonal wrench and when it is turned the drill bit is given an axial feed, although a considerable torque has to be applied. The internal thread of the support stub extends over its entire length, and after the pipe has been drilled, the sealing is accomplished only by the threaded connection between the drill bit and the support stub. A not inconsiderable leakage must be expected, which is undesirable particularly in the case of pipes carrying gas.

SUMMARY OF THE INVENTION

It is therefore an object of the invention to provide an improved pipe tapping valve which enables the drilling of the pipe to be safely and reliably performed.

It is also an object of the invention to provide a pipe tapping valve which is comparatively easy and inexpensive to manufacture.

Another object of the invention is to provide a pipe tapping valve which affords adequate sealing both during the drilling and after the drilling.

A further object of the invention is to provide a pipe tapping valve which is easy to use and which assures reliable sealing for a long period of time after the drilling.

An additional object of the invention is to provide a pipe tapping valve which requires only a small investment in material.

These and other objects are achieved in accordance with the present invention by providing a pipe tapping valve for attachment to a pipe, the valve comprising a support stub in which a drill bit is disposed for axial movement and to which a nipple is attached, the drill bit being directly guided in the support stub and having at an upper, free end thereof an expansion or a sealing ring, and the support stub having a smooth inner surface which is essentially cylindrical and is in contact with the expansion or sealing ring of the drill bit (26), the drill bit being movable axially along the inner surface of the support stub by means of a drilling apparatus which can be attached to the support stub.

The pipe tapping valve of the invention is characterized by functional design and with little trouble it assures sealing in the area of the hole both during the drilling and thereafter over a long life of many decades. The support stub contains an inside surface that is substantially cylindrical and/or smooth without threading, and is comprised of plastic without any metal guiding sleeve. The drill bit contains at its upper free end a radial bead or a sealing ring, the bead or sealing ring being in contact with the smooth cylindrical inside surface of the support stub. In this manner guidance and/or a reliable seal is achieved between the drill bit and the support stub. The axial advancement of the drill bit is performed by means of an external drilling tool that can be attached to the support stub. The support stub advantageously contains an abutment which prevents the drill bit from coming loose. The abutment may, in particular, be an integral component of the support stub and/or be made in one piece of plastic with the latter. The preferably annular-shaped abutment has a smaller inside diameter than the adjoining cylindrical inner surface of the support stub that adjoins it in the direction toward the pipe. At its free end remote from the pipe the drill bit has a surface, especially at its free end remote from the pipe, which can be brought into contact with the above-mentioned abutment in the support stub. This surface is preferably in the form of an axial face of a radial flange, especially in the form of an annular bead which initially is in contact with the said first abutment and/or engages an annular groove adjacent to the first abutment. Advantageously the annular groove is adjoined, in the direction of the pipe, by a second abutment which first permits the drill to be locked in cooperation with the second flange.

In another embodiment, the contact surface of the drill bit associated with the said first abutment is in the form of an annular surface which preferably surrounds a projection of the drill bit at its free upper end. The annular, radially inwardly extending first abutment comprises at least one likewise inwardly pointing projection which engages a circumferential groove on the drill bit or its above-mentioned projection, and thus locks the drill bit in the first upper end position. In this embodiment the drill bit contains in its upper end portion a gasket which is sealingly in contact with the cylindrical inside surface of the support stub. Desirably, the drill bit is also likewise cylindrical over a substantial part of its total length. In assembly, the drill bit is, according to the invention, inserted into the support stub from the inside or inner surface of the fitting and pushed into the support stub toward the upper end remote from the pipe until the contact surface reaches the abutment in the support stub and/or the locking is performed. To lock the drill according to the invention in this upper end or basic position, locking means are provided, which are configured in particular as the annular groove between the two abutments or as the projection engaging the annular groove on the drill bit.

Neither the support stub nor the drill bit has intermeshing screw threads, but the axial feed is provided by an external drilling tool which can be brought into engagement with the support stub and the drill bit in a known manner. Inside of the support stub, above the entrance to a lateral nipple, there is a bead projecting inwardly, which is in contact with the cylindrical exterior surface of the drill bit. This bead serves advantageously for the guidance of the drill bit, and furthermore a predetermined annular gap is present between the exterior surface of the drill bit and the interior surface of the is support stub. This bead assures a low-friction axially parallel guidance of the drill bit, so that resistance to the axial movement of the drill bit during the drilling and during its withdrawal is reduced to a minimum.

Fundamentally, the drill bit guiding bead can be divided into individual segments distributed about the circumference. In an especially advantageous manner, however, the bead is continuous around the circumference and is sealingly in contact with the cylindrical exterior surface of the drill bit. The bead and the cylindrical exterior surface of the drill bit are coordinated with one another such that a seal is assured, while allowing for the resilient elasticity of the plastic of the fitting. After drilling, the drill bit is withdrawn to its starting position within the support stub, while now the locking means securely prevents any unwanted downward slippage or any closing off of the lateral nipple.

In a further embodiment of the invention, the pipe tapping valve can be closed with a cap which can be snap-fastened onto it. When the drilling has ended and the boring device has been removed, the cap is placed on the free end of the support stub, for example, by screwing onto it, until a catch means in the cap is brought into engagement with a catch means in the support stub. For this purpose, when the cap is installed, a given resistance must be overcome, especially resistance to screwing. From this first catch means position the cap can be released again if necessary. Between the inside surface and an outside surface of the support stub there is provided a sealing means, for example a sealing ring which, when the cap is placed on the free end of the support stub, provides a seal and maintains it even in the first catch position. The support stub furthermore has a second catch means with which the catch means body can be brought into engagement in a second catch position after a further axial movement, for example a further screwing movement. The second catch means is adapted to the catch means in the cap such that the cap can no longer be removed non-destructively. After all the work has finished, the cap is transferred to the second catch position, so that the sealing of the support stub is thereafter lastingly and reliably complete, and accidental and/or undesired release of the cap is prevented.

In a further embodiment of the invention, in the area where the lateral nipple joins the pipe tapping valve, the support stub is provided with a spherical body in the manner of a ball or an egg or the like. This is in contrast to the formerly common embodiments in which the support stub was configured only as a cylindrical expansion, i.e., it had an increased wall thickness. Ribs can expediently be provided in the area of the junction, with their outer surfaces preferably within the spherical contours of the connecting body. By means of the ribs and/or of the grooves between the ribs, or the like, excessive accumulations of material are prevented, which would be disadvantageous in the production of the fitting, especially by injection molding. The spherical body, like the support stub and the lateral nipple, is an integral component of the valve which is formed of plastic. The junction body makes it possible in an especially expedient manner for the lateral connection to be designed for the same nominal width as the pipe which is tapped or which is to be tapped by means of the pipe tapping valve. With the prior pipe tapping valves, only branch lines of reduced nominal dimensions could be connected to the pipe.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
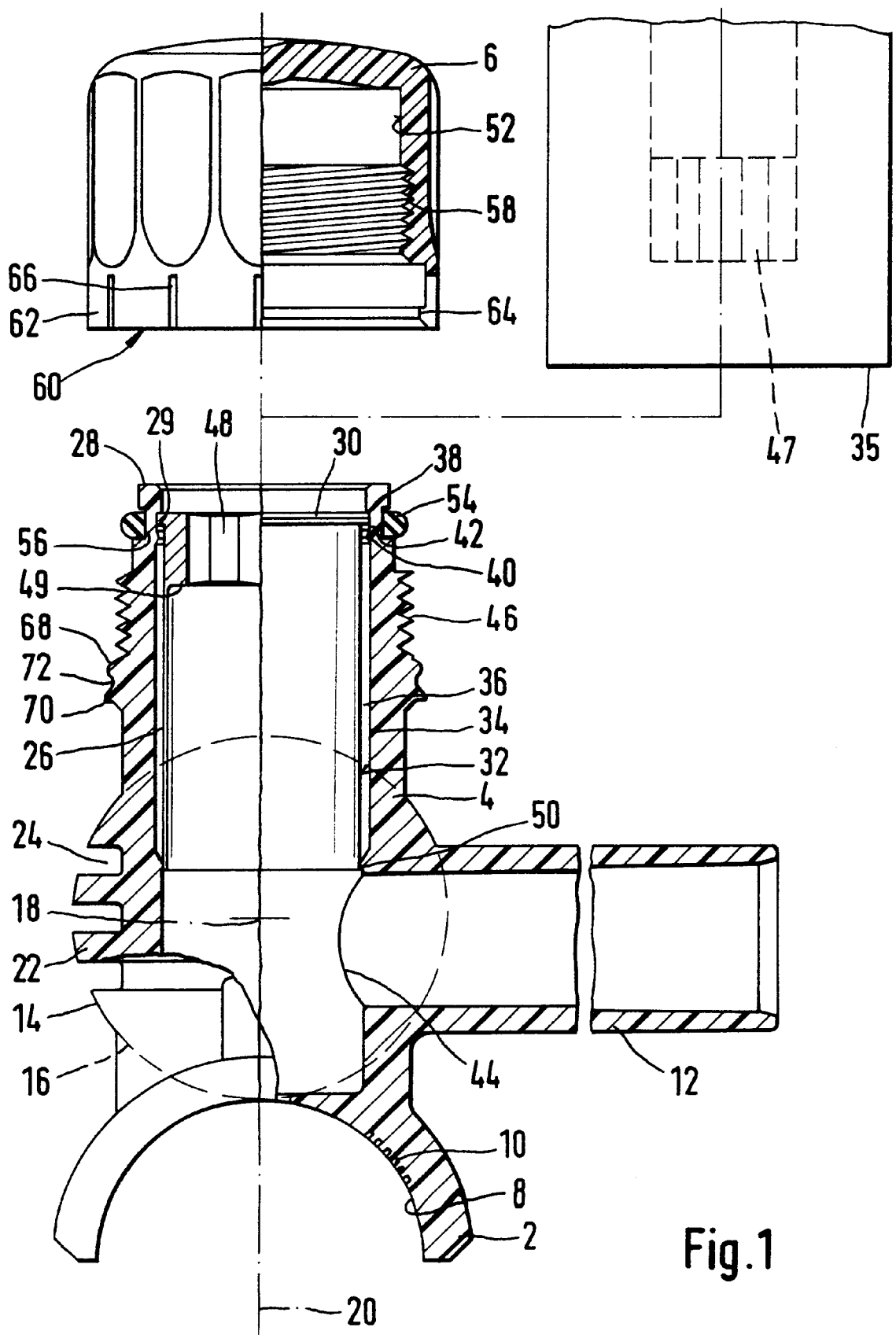
FIG. 1 is a view of the pipe tapping valve, partially in section and partially in side elevation.

FIG. 1 shows the pipe tapping valve, partially in section and partially in a side view, with a saddle 2 and a drilling support stub 4 to which a cap 6, represented as if in an exploded view, can be attached. The saddle 2 according to the invention contains in its semi-cylindrical inner surface 8, in a known manner, the heater winding 10 by means of which a welded joint can be made with a plastic pipe, here not otherwise represented, on whose cylindrical exterior the saddle 2 is placed. A lateral nipple 12 communicates with the branch member 4, which for the sake of simplicity will be referred to hereinafter as the support stub, this nipple being the means for attaching a connecting line. Where the lateral nipple joins the support stub 4, a connecting body 14 is provided, which has a spherical exterior contour, especially in the shape of a ball. Broken lines 16 indicate this contour, whose center 18 lies on the support stub axis 20.

Instead of the precise spherical or circular shape, the connecting body 14 according to the invention can have an elongated or elliptical shape or the like. Moreover the connecting body can be based on a polygonal shape. The connecting body 14 furthermore has a number of ribs 22 as well as grooves 24. In the embodiment shown, the ribs 22 and likewise the grooves 24 lie in radial planes with respect to the support stub axis 20. Preferably, the bottoms of the grooves 24 lie substantially on the outside diameter of the support stub 4.

In an alternative embodiment of the invention, the connecting body can have, for example, instead of the annular ribs and grooves, radial recesses fanning inwardly, or the ribs can have a different alignment with the axis 20 of the support stub 4. It is important to all embodiments of the spherical connecting body 14 that the connecting area be strengthened and stiffened while avoiding any excessive accumulation of material, which is disadvantageous in the manufacture of the pipe tapping valve.

Furthermore, it is made possible by means of the connecting body 14, in an especially advantageous manner, to give the lateral nipple 12 a comparatively great outside diameter. Thus, within the scope of the invention, the nipple 12 can have substantially the same outside diameter as the pipe that is to be drilled, on whose exterior the saddle 2 is fastened. The pipe and the connecting line in this case have the same nominal diameter.

In the support stub 4, a drill bit 26 is disposed, which is movable in the direction of the support stub axis. At its first end, which is located in the starting or end position at the free end 28 of the support stub 4, the drill bit 26 has a contact surface 29 which cooperates with the abutment to be explained below. The contact surface 29 is a component of the axial end surface of the drill 26. The drill bit 26 contains at its free end, the upper end in the drawing, a radial expansion 30 which is configured especially as an annular bead. Moreover, the drill bit 26 has over its entire length a cylindrical exterior surface 32, which has an annular gap 36 between it and the cylindrical and substantially smooth inner surface 34 of the support stub 4. The drill 26 lies with its contact surface 29, especially the radial expansion 30, against a first abutment 38 of the support stub 4, the first abutment 38 having a smaller inside diameter than the radial expansion 30. The abutment 38 is configured as an annular bead or projection directed radially inward toward the longitudinal axis. At the factory the drill bit 26 is installed in the support stub 4 in the position shown, the elasticity of the plastic of the fitting making it possible to insert the drill bit 26 into the support stub 4. The abutments 38 and 40 prevent the drill bit 26 from dropping out before installation.

Also, the first, upper abutment 38 prevents the drill from being rotated back out of the support stub after the drilling is completed and the drill bit is withdrawn to the position shown. It is of especial importance, furthermore, that after the schematically indicated drilling tool 35 has been removed, the drill bit 26 is prevented by means of the first, upper abutment 38 from being driven out of the support stub 4 by the pressure present in the drilled pipe, and the medium, especially gas, is prevented from escaping. The pipe fitting according to the invention satisfies, with little expenditure on manufacturing and material, the safety requirements for drilling into a pipe line under pressure in order to produce a branch line. It is to be noted that the pipe fitting according to the invention is used especially in water and gas supply systems in the known pressure ranges.

At the upper free end 28 the support stub 4 has on its interior as a stopping means a second abutment 40 which is disposed at a given distance from the first abutment toward the saddle portion 2. Between the two abutments 38 and 40 there is thus an annular groove 42 to accommodate the expanded portion 30 of the drill bit. With the second abutment 40 and the expanded portion 30, locking is assured such that, prior to installation, and especially after the drilling, any unwanted downward slippage of the drill bit 26 is prevented. Especially after the drilling such downward slippage or movement in the direction of the saddle 2 is undesired, since the drill bit 26 would close the port 44 of the branch nipple 12 and the medium could no longer properly flow into the connected line.

As already mentioned, in order to drill, the drilling tool 35 is coupled to the support stub 4, especially at its external thread 46. The drilling apparatus contains a lead screw 47 which can be brought into engagement with the polygonal surfaces 48 at the upper end 46 of the drill bit, so that the drill bit 26 can be displaced axially in the support stub 4 toward the saddle piece 2 and be rotated. The second abutment 40 has a greater diameter than that of the first abutment 38, such that the expansion 30 can be pushed past the second abutment 40 as the latter expands elastically. In an especially advantageous manner, the expansion 30 is configured as an annular bead which makes contact with the cylindrical inner surface 34 of the support stub 4 in a preferably sealing manner. The outside diameter of the annular bead 30 is related to the inside diameter of the inner surface 34 such that, according to the invention, sealing and/or good guidance and/or centering in the support stub 4 is assured. The lead screw 47 furthermore contains means, not further represented, which catch other means provided on an internal rim 49 of the drill bit 26 in order to permit withdrawal of the drill bit 26 to the starting or end position shown.

Above the port 44 of the lateral nipple 12 the support stub 4 contains an inwardly directed projection 50 which makes contact with the cylindrical outer surface 32 of the drill bit. The projection 50 preferably has an annular configuration, and its inside diameter is related to the outside diameter of the drill bit 26 such as to assure guidance and/or sealing. Thus a two-fold guidance and sealing is provided for the drill bit 26, on the one hand by the radial expansion and/or annular bead 30 of the drill bit, and on the other hand by the inwardly directed projection 50 of the support stub 4. With little production and material cost, a functional double and axially spaced guidance and/or covering of the drill bit 26 is assured even during the drilling operation. The material pairing of the metal drill bit 26 and the plastic support stub 4 assures low friction losses and the drilling operation can be performed with comparatively little expenditure of force, inasmuch as the annular gap 36 explained above is present between the outer surface 32 of the drill bit and the inner surface of the support stub. In a preferred manner, the projection 50 serves, according to the invention, also to limit the axial feed of the drill bit 26 as the drilling is performed.

The support stub 4 can be closed up by means of the cap 6, which is shown removed in FIG. 1. Inside of the cap 6 there is a cylindrical sealing surface 52 which is associated with a sealing ring 54 on the support stub 4. The sealing surface adjoins the bottom 53 inside of the cap. The sealing ring 54 is disposed in an outer annular groove 56 near the free end 28 of the support stub 4. Alternatively, the sealing ring can be disposed in the cap 6, while the associated sealing surface is provided externally at the free end 28 of the support stub 4. It is important that the sealing surface 52 is cylindrical, so that the sealing effect is obtained as soon as the cap 6 is placed partially at first on the support stub 4. The cap 6 has towards its open end, adjoining the sealing surface 52, an internal thread 58 which can be brought into engagement with the external thread 46 of the support stub 4. At the open end 60 the cap 6 has at least one catch means 62. This catch means 62 advantageously has a hook 64 pointing radially inward. The open end 60 of the cap 6 is provided with a plurality of slots 66, so that a number of the above-mentioned catch means 62 are present, distributed over the circumference, which can be resiliently spread radially outward.

A first catch means 68 on the outside of the support stub 4 is associated with the catch means 62. When the cap 6 is installed, especially when it is screwed on, the given torsional resistance must be overcome to enable the catch means 62 to climb over the first catch means 68. The inside diameter of the catch means 62 and especially its internal hook 64 is coordinated with the first catch means 68 so that the establishment of the snap fastening requires a substantially greater application of force than the emplacement or screwing on of the cap 6 requires. As soon as the catch means 62 passes over the first catch means 68 and/or engages the latter, the cap 6 has assumed its first catch position. The snap fastening is designed according to the invention so that the cap 6 can be moved again from this first catch position in order to be removed entirely from the support stub 4 if necessary. After the drilling operation, a preliminary locking of the cap on the support stub 4 during assembly is thus assured, and a reliable seal is already assured all around by means of the sealing ring 54.

If the assembly operation has then progressed to the point that no further checking including removal of the cap 6 is necessary, the cap 6 is brought to its final, secured position. In the direction toward the saddle 2, the support stub 4 has a second catch means 70 which has a larger outside diameter than the first catch means 68. If the cap 6 has been pushed further toward the saddle 2, an additionally increased resistance is to be overcome until the catch means 62, especially its hook 64, has passed over the second catch means 70 and becomes caught behind it. In the second position then assumed the cap is finally and lastingly secured in relation to the support stub 4. The cap 8 can no longer be removed or unscrewed non-destructively from the support stub. As shown, an additional annular groove 72 is present between the two catch means 68 and 70, which is engaged by the catch means 62 and its hook 64 in the above-described first catch position. The depth of the annular groove 72 and/or the outside diameter of the first catch means 68 are coordinated with one another in such a manner that the cap 6 can be removed again, but can be moved toward the saddle 2 in order thus to assume the second, secured position.

Figure 2:
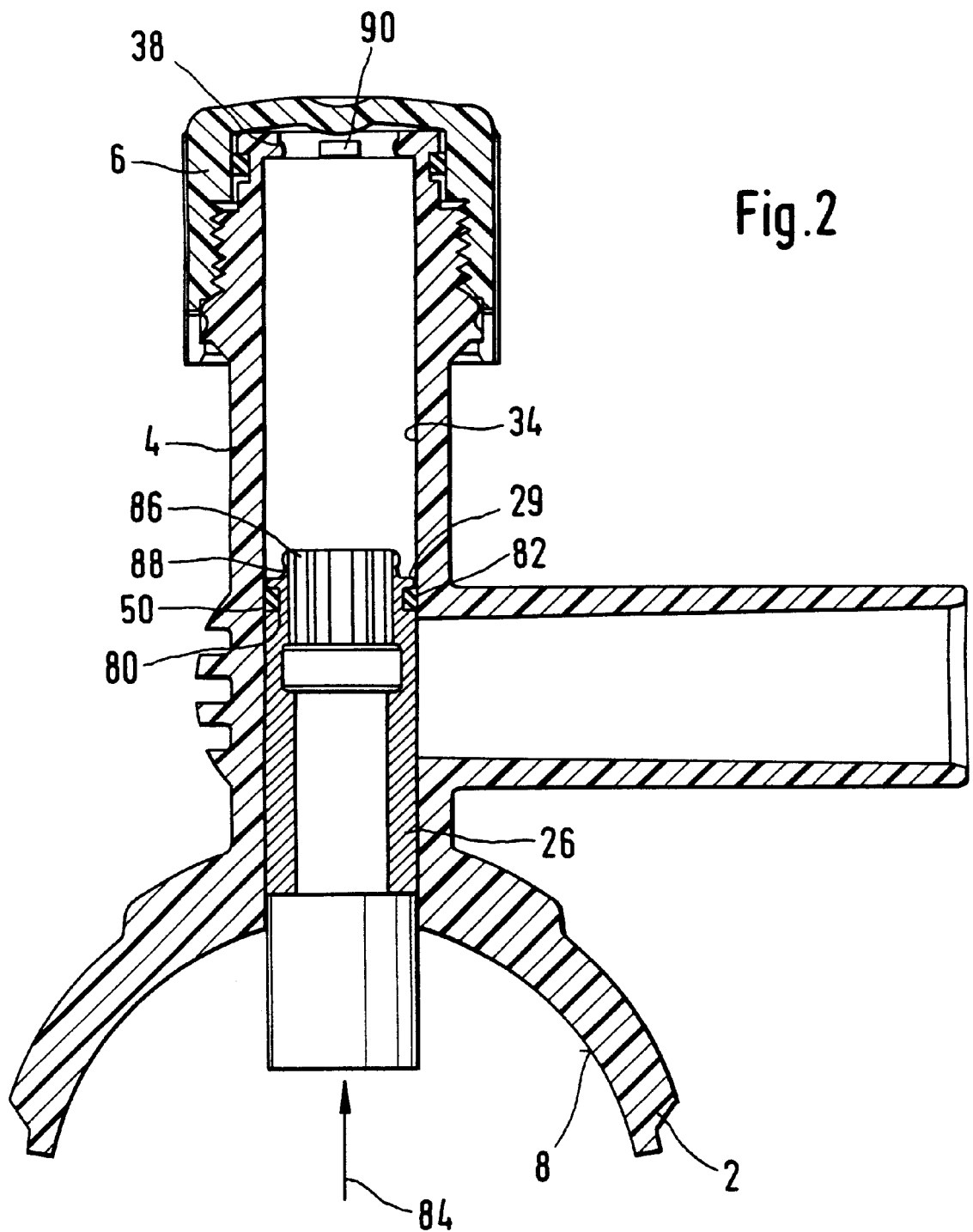
FIG. 2 is an additional embodiment in which the drill is in a lower end position after a pipe has been drilled.

FIG. 2 shows another embodiment of the pipe tapping valve in which the drill bit 26 assumes a second position wherein it is situated inside the pipe after drilling, which is not shown here. The drill bit 26 contains in groove 80 at its upper end a seal 82 which is in sealing contact with the cylindrical inside surface 34 of the support stub 4. The seal 82 is an elastomeric ring and/or O-ring. In this particular embodiment the drill bit is inserted during assembly from the inside surface 8 of the saddle 2 toward the support stub, in the direction of the arrow 84. The elastic seal 82 is easily moved over a radially inward-reaching bead 50 of the support stub 4 by overcoming a given force. During the drilling operation, however, the bead 50 equally provides a sufficient limitation of the drill bit's movement. The drill bit 26 furthermore has a contact surface 29 which is configured as an annular surface, and above which the shank of the drill bit projects. The shank has on its outside an annular groove 88 which is a component of the locking means. The locking means furthermore contain, at the upper, free end at the first abutment 38, which again is configured as an annular bead reaching radially inward, at least one projection 90 reaching radially inward. It is desirable to provide several such projections or cams distributed over the circumference. The drill shank 86 and the annular groove, on the one hand, and the abutment 38 and the projections or cams 90 on the other, are so coordinated that the locking of the drill bit 26 in the upper starting or end position is assured. In this case the drill shank 86 is situated inside of the annular abutment 38, where the at least one projection 90 engages the annular groove 88.

Figure 3:
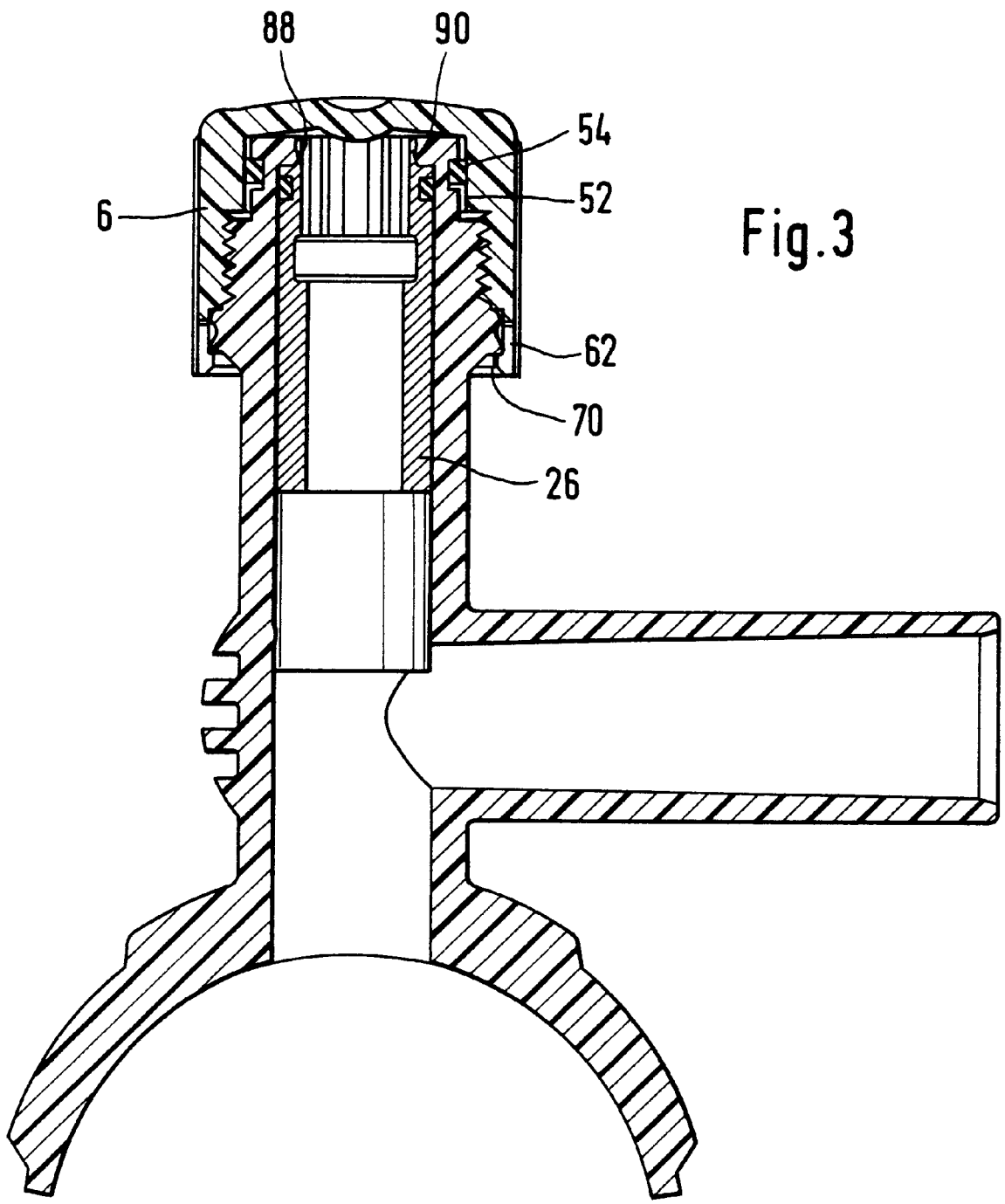
FIG. 3 is a view of the fitting according to FIG. 2, in which the drill is in the upper, basic position.

FIG. 3 shows the drill bit 26 in its upper end position after the drilling operation. As mentioned, the projections or cams 90 enter the annular groove 88 of the drill bit 26, The cap 6 is screwed onto the support stub in the manner explained, while the catch means 62 have already been pushed past the second catch means 70 and locked onto it, so that the cap 6 assumes its second, secured position. The sealing ring 54 is in sealing contact with the associated sealing surface 52 inside of the cap 6.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pipe tapping valve for attachment to a pipe, said valve comprising:
    a support stub defining a saddle within which a pipe outer surface is to be received,
    a one-piece drill bit disposed in said support stub for axial movement, the drill bit being directly guided in the support stub and having a substantially cylindrical external surface,
    a radially inwardly extending projection which is in direct contact with said substantially cylindrical external surface of the drill bit, said projection being annular and providing a seal between said external surface of the drill bit and said support stub,
    a nipple defining a branch connection attached to said support stub, said radially inwardly extending projection being disposed adjacent to a port interconnecting an interior of the support stub and the branch connection, and
    a protrusion of the drill bit or a sealing ring on the drill bit at an upper, free end of the drill bit remote from the saddle, said upper, free end further defining at least one surface for engaging a portion of a drilling tool,
    wherein the support stub has an inner surface which is essentially cylindrical and is in contact with the protrusion of or the sealing ring on the drill bit, said drill bit being movable axially along said inner surface of the support stub by said drilling tool which can be attached to the support stub, and
    wherein a cylindrical annular gap is defined between the inner surface of the support stub and the cylindrical external surface of the drill bit, the cylindrical gap, in an upper rest position of the drill bit, extending over a major portion of the total length of the drill bit.

2. A pipe tapping valve according to claim 1, wherein the saddle is welded to the pipe.

3. A pipe tapping valve according to claim 1, wherein the support stub comprises a first abutment against which a contact surface on the drill bit can be brought into engagement.

4. A pipe tapping valve according to claim 3, wherein the protrusion is a radial protrusion at an upper, free end of the drill bit, and said contact surface is arranged on said radial protrusion.

5. A pipe tapping valve according to claim 4, wherein said contact surface comprises an annular surface surrounding the protrusion at the upper, free end of the drill bit.

6. A pipe tapping valve according to claim 4, wherein the support stub comprises a second abutment over which the radial protrusion of the drill bit can be moved by overcoming a given force.

7. A pipe tapping valve according to claim 6, wherein between the first abutment and the second abutment on the support stub there is an annular groove in which the protrusion of the drill bit is disposed.

8. A pipe tapping valve according to claim 3, wherein said first abutment comprises at least one radially inwardly pointing cam, and the drill bit comprises a shank portion with an annular groove in which the cam engages.

9. A pipe tapping valve according to claim 1, wherein said annular gap is disposed axially between the protrusion or sealing ring of the drill bit and said radially inwardly extending projection.

10. A pipe tapping valve according to claim 1, wherein said nipple and said pipe have essentially the same diameter.

11. A pipe tapping valve for attachment to a pipe, said valve comprising:

a support stub in which a drill bit is disposed for axial movement and to which a nipple is attached, wherein the drill bit is directly guided in the support stub, and the drill bit has at an upper, free end thereof a protrusion of the drill bit or a sealing ring on the drill bit, and wherein the support stub has an inner surface which is essentially cylindrical and is in contact with the protrusion of or the sealing ring on the drill bit, said drill bit being movable axially along said inner surface of the support stub by means of a drilling apparatus which can be attached to the support stub, and wherein a connecting body is provided where the nipple joins the support stub, said connecting body having a spherical or elliptical rounded contour and being provided with reinforcing ribs or grooves substantially within said rounded contour.

12. A pipe tapping valve for attachment to a pipe, said valve comprising:

a support stub in which a drill bit is disposed for axial movement and to which a nipple is attached, wherein the drill bit is directly guided in the support stub, and the drill bit has at an upper, free end thereof a protrusion of the drill bit or a sealing ring on the drill bit, and wherein the support stub has an inner surface which is essentially cylindrical and is in contact with the protrusion of or the sealing ring on the drill bit, said drill bit being movable axially along said inner surface of the support stub by means of a drilling apparatus which can be attached to the support stub, and further comprising a cap for closing the support stub, said cap being secured to said support stub by means of a snap fastener comprising catch means on said cap and catch engaging means on said support stub.

13. A pipe tapping valve according to claim 12, wherein the catch means are disposed at an open end of said cap and have an inside surface provided with a hook member.

14. A pipe tapping valve according to claim 12, wherein plural catch means are distributed about the circumference of the cap and separated from one another by slits.

15. A pipe tapping valve according to claim 12, wherein the support stub is provided with a first catch engaging means and a second catch engaging means spaced an axial distance from said first catch engaging means with an annular groove between the first and second catch engaging means, such that when the cap is installed, after overcoming a first resistance the cap is movable to first position in which the catch means are engaged by the first catch engaging means and from which the cap can be released, and after overcoming a second resistance greater than said first resistance the cap is movable to a second position in which the catch means are engaged by said second catch engaging means and from which the cap cannot be non-destructively released.

16. A pipe tapping valve according to claim 15, wherein a threaded connection is provided between said cap and said support stub, said threaded connection comprising external threads provided on said support stub between said first catch engaging means and the free end of the support stub and mating internal threads on said cap.

17. A pipe tapping valve according to claim 12, further comprising a sealing ring disposed between the cap and the support stub, said sealing ring being received in a groove on said support stub and sealingly contacting a cylindrical sealing surface on said cap.

* * * * *